Nov. 14, 1950      N. F. GARWOOD      2,530,121
LINE ANCHORING DEVICE
Filed March 30, 1949
Fig. 1.
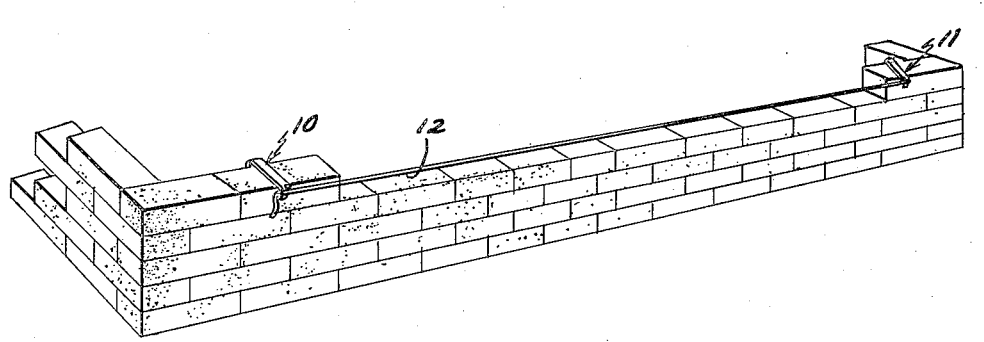
Fig. 2.
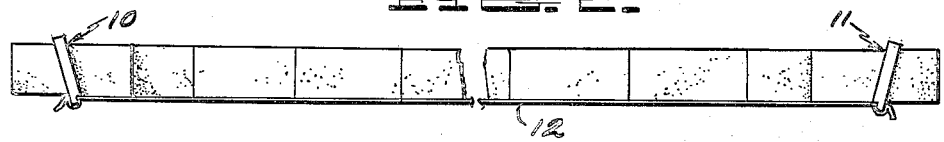
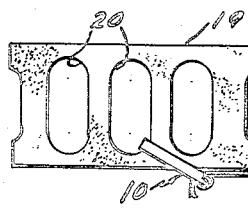
Fig. 9.
Fig. 3.
 
Fig. 5.    Fig. 6.
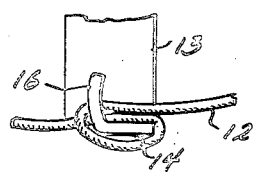
Fig. 8.
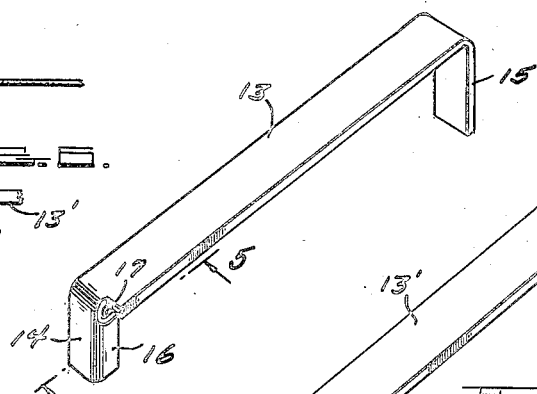
Fig. 4.
INVENTOR.
NORMAN F. GARWOOD
BY
Adams & Bush
ATTORNEYS
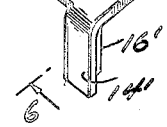
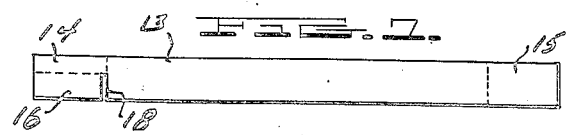
Fig. 7.

Patented Nov. 14, 1950

2,530,121

UNITED STATES PATENT OFFICE 2,530,121

LINE ANCHORING DEVICE

Norman Franklin Garwood, Indianapolis, Ind.

Application March 30, 1949, Serial No. 84,370

1 Claim. (Cl. 33—86)

This invention relates to line anchoring devices and has more particular reference to such devices especially designed for use by bricklayers, masons, and other artisans for holding a horizontal line in position when erecting a wall or partition, or when filling between walls.

One object of the invention is to provide a novel and improved line holding device capable of being easily and accurately anchored to the previously laid layers, whether of brick, block, or tile, and to hold the line taut or properly stretched.

Another object of the invention is to provide a line holding device, as above characterized, including means for quickly and securely anchoring the line.

Another object of the invention is to provide a line holding device, as above characterized, which is simple and rugged in operation and one which may be conveniently carried in the pocket when not in use.

Other objects and advantages of the invention will appear in the following specification when considered with the accompanying drawings, wherein:

Fig. 1 is a perspective view of a line holding device constructed in accordance with the present invention, showing the manner of supporting a horizontal line on a wall;

Fig. 2 is a plan view, with parts broken away, showing the line holding device of Fig. 1 mounted on a wall;

Fig. 3 is an enlarged perspective view of the left hand anchoring bar shown in Figs. 1 and 2;

Fig. 4 is a similar view showing the right hand anchoring bar;

Fig. 5 is a fragmentary view, in side elevation, taken on the line 5—5 of Fig. 3;

Fig. 6 is a fragmentary view, in side elevation, taken on the line 6—6 of Fig. 4;

Fig. 7 is a plan view of a blank from which the left hand anchoring bar shown in Fig. 3 is made;

Fig. 8 is a fragmentary detailed view showing the manner in which a line is secured to an anchoring bar; and Fig. 9 is a plan view showing the manner in which an anchoring bar is mounted on a building block.

Referring now to the drawing, there is shown in Figs. 1 and 2, one form of a line holding device constructed in accordance with the present invention and showing the manner in which it is employed in laying a brick wall. As there shown, the device comprises a left hand anchoring bar 10; a right hand anchoring bar 11; and a line 12 secured to the bars and stretched taut therebetween. The anchoring bars may be made of any suitable material, but preferably are made of light weight metal.

As shown in Figs. 3 and 5, the left hand anchoring bar 10 comprises a narrow, flat elongated strip 13 having its ends bent downwardly to form depending clamping legs 14, 15 extending normal to the body portion. The front leg 14 is provided with an integral flange 16 extending along its right edge and projecting rearwardly therefrom at a 90° angle. The flange 16 extends under the body portion of the strip 13 and its upper edge is spaced from the under surface of the body portion to form a wedging slot 17. Preferably, and as shown in Fig. 7, the anchoring bar 10 is formed from an elongated narrow strip of aluminum provided with a rectangular slot 18 adjacent one end. The ends of the strip are bent downwardly through a 90° angle to form the depending clamping legs 14, 15. Then, that portion of the depending leg below the slot is bent rearwardly through a 90° angle to form the flange 16. The width of the slot 18 is such that after the flange 16 has been bent rearwardly under the body portion of the strip, the top edge of the flange will be spaced from the under surface of the strip forming the slot 17 in the completed article.

The right hand anchoring bar 11, as shown in Figs. 4 and 6, comprises a narrow, flat elongated strip 13' having its ends bent downwardly to form depending clamping legs 14', 15' extending normal to the body portion. The front leg 14' is provided with an integral flange 16' extending along its left edge and projecting rearwardly therefrom at a 90° angle. The flange 16' extends under the body portion of the strip 13' and its upper edge is spaced from the under surface of the body portion to form a wedging slot 17'. The right hand bar 11' is made of the same material and in the same manner as is the left hand bar 10. The widths of the slots 17, 17' are such that the line 12 may readily be received therein.

The manner in which the line 12 is secured to the anchoring bar 10 is shown in Fig. 8. As there shown, one end of the line is slid into the slot 17 and seats in the base of the slot; then, the end of the line is wrapped around the upper portion of the leg 14 at its juncture with the strip and forced down into the slot, thereby tightly wedging the line in the slot. The other end of the line is secured in the right hand anchoring bar in the same manner.

The horizontal distance between the vertical edges of the flanges 16, 16' and the legs 15, 15', respectively, is the same and is slightly longer than the width of an ordinary brick to enable the bars to be mounted on bricks of various sizes. The widths of the flanges 16, 16' are such that when the vertical free edges of the flanges engage the side walls of the bricks, the line 12 will be held spaced slightly forward of the forward edge of the bricks to hold the line in proper position to guide the laying of the remaining bricks in the course. In this position, the line will not be pinched between the bricks and the anchoring bars.

The manner in which the device is employed in laying a brick wall is illustrated in Figs. 1 and 2. The left and right hand anchoring bars have been mounted in a straddling position on the spaced-apart last laid bricks in the course. The ends of the line are secured to the right and left hand bars and the bars are spread apart to draw the line taut. This results in turning the bars to oblique position on their respective bricks, thereby causing the clamping legs to tightly grip the side walls of the bricks and firmly anchor the bars thereto (see Fig. 2). The tighter the line is stretched, the tighter the anchoring bars will grip their respective bricks.

In Fig. 9, there is shown the manner in which an anchoring bar is mounted on a building block, regardless of its size. The building block 19 shown, is of the usual construction and is provided with lightening holes 20. The anchoring bars are mounted on blocks of this type by straddling the partition forming the side wall of a lightening hole, as shown in Fig. 9.

From the foregoing, it readily will be seen that there has been provided a novel and improved line holding device capable of being quickly and accurately mounted on bricks, blocks, or tiles, to hold a horizontal line in proper position without danger of pinching the line against the bricks or blocks, and having means by which the line may quickly be attached and detached.

The device is simple and rugged in construction, efficient and durable in operation, and one which may be conveniently carried in the pocket when not in use.

Obviously, the invention is not restricted to the particular modification of the invention herein shown and described.

Having thus described the invention, what is claimed is:

A line anchoring device comprising an elongated flat rectangular member having a depending integral clamping leg at each end, one of said legs having a flange formed along one of its sides and extending rearwardly therefrom under said member with said flange having a free vertical edge adapted to engage one side wall of a brick and having its upper edge spaced from the under surface of said member to form a wedging slot, the construction being such that one end of the line can be wrapped around the upper end of the flanged leg and wedged in said slot and the line pulled taut to bring the free vertical edge of the flange against the side wall of a brick without pinching the line.

NORMAN FRANKLIN GARWOOD.

REFERENCES CITED

The following references are of record in the file of this patent:

UNITED STATES PATENTS

| Number | Name | Date |
| --- | --- | --- |
| 946,964 | Hall | Jan. 18, 1910 |
| 995,714 | Platt | June 20, 1911 |
| 1,004,194 | Platt | Sept. 26, 1911 |
| 1,080,836 | Lake | Dec. 9, 1913 |
| 1,466,563 | Rutherford | Aug. 28, 1923 |
| 1,878,448 | Cornuelle | Sept. 20, 1932 |
| 2,030,539 | Riley | Feb. 11, 1936 |
| 2,215,663 | Frisk | Sept. 24, 1940 |
| 2,278,735 | Perry | Apr. 7, 1942 |